United States Patent
Gabriele et al.

(10) Patent No.: US 10,373,165 B2
(45) Date of Patent: Aug. 6, 2019

(54) AUTOMATED SENSOR-BASED CUSTOMER IDENTIFICATION AND AUTHORIZATION SYSTEMS WITHIN A PHYSICAL ENVIRONMENT

(71) Applicant: CAPITAL ONE SERVICES, LLC, McLean, VA (US)

(72) Inventors: David Gabriele, Chicago, IL (US); Justin Smith, Chicago, IL (US); Damaris Kroeber, Bitterfeld-Wolfen (DE); Devin Barth, Chicago, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 76 days.

(21) Appl. No.: 15/714,567

(22) Filed: Sep. 25, 2017

(65) Prior Publication Data
US 2019/0095925 A1   Mar. 28, 2019

(51) Int. Cl.
*G06Q 20/40* (2012.01)
*G06Q 20/32* (2012.01)

(52) U.S. Cl.
CPC ... *G06Q 20/40145* (2013.01); *G06Q 20/3226* (2013.01)

(58) Field of Classification Search
CPC .... G06Q 20/40; G06Q 20/20; G06Q 30/0269; G06Q 20/40145; G06Q 20/4016; G06Q 50/265; G06K 9/00221; G06K 9/00348; G06K 9/00362
See application file for complete search history.

(56) References Cited

U.S. PATENT DOCUMENTS

| | | | |
|---|---|---|---|
| 2013/0318359 A1* | 11/2013 | Morris | H04L 9/3257 713/185 |
| 2014/0363059 A1* | 12/2014 | Hurewitz | G06Q 30/0201 382/118 |
| 2015/0012396 A1 | 1/2015 | Puerini et al. | |

(Continued)

OTHER PUBLICATIONS

Natt Garun, The Verge, Amazon just launched a cashier-free convenience store, https://www.theverge.com/2016/12/5/13842592/amazon-go-new-cashier-less-convenience-store.*

*Primary Examiner* — Hao Fu
(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform steps of a method providing sensor-based authentication of customers. The system may detect customer biometric data associated with an unknown customer present at a merchant location. The system may determine, based on a known customer identification profile and the detected customer biometric data, a confidence level that the unknown customer is the same individual as the known customer and authenticate the unknown customer based on a determination that the confidence level exceeds a predetermined threshold. The system may transmit identification information associated with the known customer to a financial service provider and receive payment credentials of one or more accounts associated with the known customer and authorization to utilize the one or more accounts to perform a financial transaction.

21 Claims, 6 Drawing Sheets

(56) References Cited

U.S. PATENT DOCUMENTS

2016/0048670 A1* 2/2016 Kim .................. G06K 9/00073
  382/117
2017/0323299 A1* 11/2017 Davis ............... G06Q 20/40145
2018/0025601 A1* 1/2018 Gao ..................... G07G 1/0081
  340/572.1

* cited by examiner

AUTOMATED SENSOR-BASED CUSTOMER IDENTIFICATION AND AUTHORIZATION SYSTEMS WITHIN A PHYSICAL ENVIRONMENT

FIELD OF INVENTION

The present disclosure relates to sensor-based customer authentication systems and related methods, and more particularly providing systems and methods for passively verifying a customer's identity at a merchant location.

BACKGROUND

Authenticating customers and facilitating payment for everyday items at a store is currently a multi-step process for customers and storeowners. A customer must first select all the desired items before waiting in line to check out and authorize payment. Customers are tasked with carrying traditional payment methods (cash, credit card, debit card) and must deal with significant delay in the check-out process due to the current method of payment authorization. Merchants are tasked with authenticating customers who pay with financial accounts by requesting identification and security information such as a pin number or zip code associated with a card. Additionally, merchants must currently devote significant resources to staffing check-out lanes, as well as devoting a large physical space to the check-out process which could otherwise be used for the display and storage of products.

To expedite the payment authorization process and improve the customer experience, some merchants are experimenting with wireless check-out systems (e.g., check-out systems that use Near Field Communications "NFC," Bluetooth Low Energy "BLE," or Radio Frequency Identification "RFID" technologies). For example, some merchants are developing systems that allow the merchant to wirelessly identify products that a customer has placed in their shopping cart or are carrying on their person, to avoid the need to go through a check-out line. However, there is still a need to facilitate payment methods and authentication of users of these systems.

Accordingly, there is a need for improved devices, systems, and methods that expedite the process for customers to check-out and seamlessly authorize payment for items in order to reduce the dedication of significant space and manpower to the checkout process by merchants as well as streamlining the entire check-out process for the customers, and embodiments of the present disclosure are directed to this and other considerations.

SUMMARY

Disclosed embodiments provide systems and methods for authenticating a customer.

Consistent with the disclosed embodiments, the system may include one or more memory devices storing instructions, one or more sensors positioned proximate a merchant location, and one or more processors configured to execute the instructions to perform steps of a method of authenticating a customer. The system may execute the instructions to detect, by one or more sensors, customer biometric data associated with an unknown customer present at the merchant location. The system may determine, based on a known customer identification profile associated with a known customer and the detected customer biometric data, a confidence level that the unknown customer is the same individual as the known customer. The customer identification profile may include identification information and biometric data associated with the known customer. The system may authenticate the unknown customer as the known customer when the confidence level exceeds a predetermined threshold. In response to authenticating the unknown customer as the known customer, the system may transmit the identification information associated with the known customer to a financial service provider server. The system may receive, from the financial service provider server, payment credentials of one or more accounts associated with the known customer and authorization to utilize the one or more accounts to perform a financial transaction.

Consistent with the disclosed embodiments, methods for authenticating a customer device are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
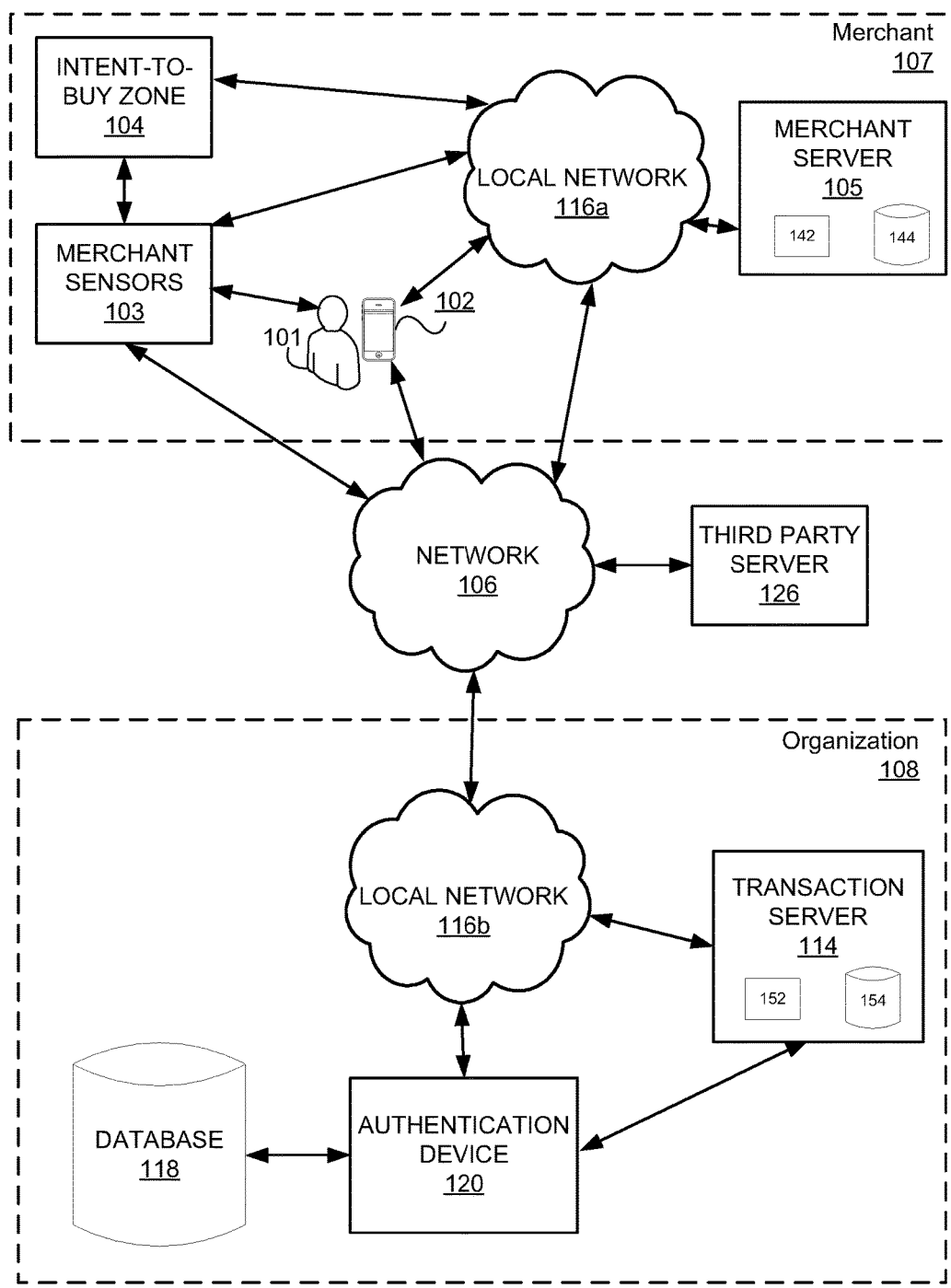
FIG. 1 is a diagram of an exemplary customer authentication system, in accordance with some embodiments.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for authenticating a customer. The system may include one or more memory devices storing instructions, one or more sensors positioned proximate a merchant location, and one or more processors configured to execute the instructions to perform steps of a method. Specifically, in some embodiments, the system may execute the instructions to detect, by one or more sensors, customer biometric data associated with an unknown customer present at the merchant location. The system may determine, based on a known customer identification profile associated with a known customer and the detected customer biometric data, a confidence level that the unknown customer is the same individual as the known customer. The customer identification profile may include information and biometric data associated with the known customer. The system may authenticate the unknown customer as the known customer when the confidence level exceeds a predetermined threshold. In response to authenticating the unknown customer as the known customer, the system may transmit the identification information associated with the known customer to a financial service provider server. The system may receive, from the financial service provider server, payment credentials of one or more accounts associated with the known customer and authorization to utilize the one or more accounts to perform a financial transaction.

In another embodiment, another system for authenticating a customer is disclosed. The system may include one or more memory devices storing instructions, and one or more processors configured to execute the instructions to perform steps of a method. Specifically, in some embodiments, the system may execute the instructions to receive, from a merchant server, detected customer biometric data associated with an unknown customer present at a merchant location. The system may determine, based on a plurality of known customer identification profiles associated with a plurality of known customers and the detected customer biometric data, a plurality of confidence levels, where each of the plurality of confidence levels represents a likelihood that the unknown customer is the same individual as the unique known customer associated with the respective known customer identification profile. Each known customer identification profile may include identification information and biometric data associated with a unique known customer of the plurality of known customers. The system may identify a greatest confidence level of the plurality of confidence levels, where the greatest confidence level is associated with a first known customer of the plurality of customers and a first known customer identification profile of the plurality of known customer identification profiles. The system may transmit, based on identification information associated with the first known customer identification profile and responsive to determining that the greatest confidence level exceeds a predetermined threshold, payment credentials of one or more financial accounts associated with the first known customer to the merchant server.

In another embodiment, a method for authenticating a customer is disclosed. The method may include detecting, by one or more sensors, customer biometric data associated with an unknown customer present at a merchant location. The method may include transmitting, to a financial service provider server, the detected customer biometric data. The method may include receiving, from the financial service provider server, authentication that the unknown customer is a known customer. The method may further include receiving, from the financial service provider server, payment credentials of one or more financial accounts associated with the known customer.

Although the above embodiments are described with respect to systems and a method, it is contemplated that embodiments with identical or substantially similar features may alternatively be implemented as methods, systems, and/or non-transitory computer-readable media.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that may authenticate a customer. The components and arrangements shown in FIG. 1 are not intended to limit the disclosed embodiments as the components used to implement the disclosed processes and features may vary. As shown, system 100 may include a merchant 107 connected to an organization 108 via a network 106. Merchant 107 may include, for example, one or more user devices 102, each which may be associated with a respective customer 101, one or more merchant sensors 103, an intent-to-buy zone 104, a merchant server 105, and a local network 116a. Organization 108 may include, for example, a transaction server 114, a local network 116b, a database 118, and an authentication device 120.

In some embodiments, merchant 107 may be associated with an entity such as a business, corporation, individual, partnership, or any other entity that may be a seller of good and/or services such as a grocery store, a movie theater, a gas station, or the like. According to some embodiments, organization 108 may be associated with an entity such as a business, corporation, individual, partnership, or any other entity that may provide financial services or processing of financial transactions such as a bank, a credit card company or the like. According to some embodiments, organization 108 may be associated with an entity that provides goods and services. In some embodiments, merchant 107 and organization 108 may be associated with the same or related entities. Accordingly, although merchant 107 and organization 108 are shown as being separate in FIG. 1, it should be understood that in some embodiments, some or all of the elements of merchant 107 and organization 108 may be combined together into a single organization.

In some embodiments, a customer 101 may operate user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 106 and/or with one or more components of organization 108. In some embodiments, a user device 102 may include or incorporate electronic communication devices for hearing or vision impaired users. User device 102 may belong to or be provided by customer 101, or may be borrowed, rented, or shared. Customers 101 may include individuals such as, for example, subscribers, clients, prospective clients, or customers of an entity associated with merchant 107 and/or organization 108. According to some embodiments, user device 102 may include an environmental sensor for obtaining audio or visual data, such as a microphone and/or digital camera, a geographic location sensor for determining the location of the device, an input/ output device such as a transceiver for sending and receiving data (e.g., via WiFi, cellular communications, near-filed communications, Bluetooth, and the like), a display for displaying digital images, one or more processors, and a memory in communication with the one or more processors.

Merchant sensors 103 may be one or more sensors that are configured to obtain sensor data from one or more customers 101 and/or user devices 102 that are associated with the one or more customers 101. Merchant sensors 103 may include, for example but not limited to, one or more of a digital camera, a digital video camera, a scale, a retina scanner, a fingerprint scanner, a microphone, a heartbeat sensor, a scent/odor sensor, beacons, radio frequency detection sensors or receivers that are capable of detecting and/or receiving wireless signals (e.g., WiFi, cellular, Bluetooth, NFC, etc.), and other types of sensors that may obtain data that may be used to identity an individual. Accordingly, in some embodiments, merchant sensors 103 may be configured to obtain biometric data from customer 101 including data that is representative of one or more of a face, a body image, a height, a weight, a voice signature, a fingerprint, a smell/odor, a retina, a gait, or a heart rate. Further, merchant sensors 103 may be configured to obtain or detect device information from a user device 102 associated with customer 101 by detecting an electronic signal that is transmitted by user device 102. For example, merchant sensors 103 may include a router or base station that is capable of detecting wireless signals generated by user device 102 and/or communicating with user device 102 to determine or detect device information associated with user device 102. For example, according to some embodiments, merchant sensors 103 may be able to detect and/or determine device information such as mobile device ID names, identifiers or numbers, MAC addresses, a Bluetooth signal, an operating system, screen size, memory size, device manufacturer, third party application, third party application credentials, GPS/location data, or other such device information associated with user device 102. In some embodiments, merchant sensors 103 may be fixed in a particular location. For example, a plurality of merchant sensors 103 may be positioned in fixed locations throughout a store or other area designated by merchant 107 or an affiliated merchant. According to some embodiments, one or more merchant sensors 103 may be configured to track the movement of an individual throughout a predefined area, such as a store. In some embodiments, one or more merchant sensors 103 may be configured to detect when an individual has entered an intent-to-buy zone 104, as described below.

Intent-to-buy zone 104 may be a designated or predetermined area of a physical location, such as an area of a store near checkout counters or in front of the exit doors of the store, which is associated with an opportunity to initiate a transaction. For example, in some embodiments, if an individual enters an intent-to-buy zone 104, it may signify that the individual desires to make a purchase of items that the user is carrying or has in a shopping cart. For example, in the context of a grocery store, intent-to-buy zone 104 may be an area in front of the exit doors of the store, and a customer may be enabled to purchase a number of items from the grocery store by simply entering intent-to-buy zone 104 with the items. According to some embodiments, merchant sensors 103 may be configured to detect and/or track items (e.g., grocery items) as well as detecting and tracking individuals. Accordingly, in some embodiments, system 100 may enable an individual to enter a store without any identification, mobile device, cash, or any other means of payment or identification, collect items from the store, and upon exiting the store, system 100 may authorize and initiate a purchase of the items using an account (e.g., a debit account or credit card account) associated with the individual by identifying the individual and the items sought to be purchased and initiating a purchase of the items in association with a financial account of the identified individual.

Merchant server 105 may include a computer system configured to receive sensor data from one or more merchant sensors 103 that may provide detected biometric data associated with customer 101, device information associated with a user device 102, or data sufficient to identify one or more items sought to be purchased by customer 101. According to some embodiments, merchant server 105 may store item data, such as a catalog of items that are for sale (e.g., items for sale within a grocery store) that may include for example, an identification tag associated with each item (e.g., a barcode, a QR code, a SKU number, an identification beacon or other identity tag) and a sales price such that merchant server 105 may determine the number, nature, and price of items sought to be purchased by customer 101 in response to receiving sensor data representing the detected presence of a number of items in, for example, the intent-to-buy zone 104. Merchant server 105 may have one or more processors 142 and one or more transaction server databases 144, which may be any suitable repository of item data. Information stored in merchant server 105, such as for example, biometric data and/or item data, may be accessed (e.g., retrieved, updated, and added to) via local network 116a and/or network 106 (including for example, via local network 116b) by one or more devices (e.g., authentication device 120) of system 100.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may include one or more servers, devices, and computer systems for performing one or more functions associated with products and/or services that organization 108 provides. Such servers, devices, and computer systems may include, for example, web server 110, transaction server 114, and authentication device 120, as well as any other computer systems necessary to accomplish tasks associated with organization 108 or the needs of customers (which may be customers of the entity associated with organization 108 and/or merchant 107).

Transaction server 114 may include a computer system configured to process one or more transactions involving an account associated with a customer, or a request received from merchant 107 (e.g., via merchant server 105) on behalf of a customer that is attempting to make a purchase. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with merchant 107 and/or organization 108 provides to individuals such as customers. Transaction server 114 may have one or more processors 152 and one or more transaction server databases 154, which may be any suitable repository of transaction data. Information stored in transaction server 114 may be accessed (e.g., retrieved, updated, and added to) via local network 116b and/or network 106 by one or more devices (e.g., authentication device 120) of system 100.

In some embodiments, transaction server 114 tracks and stores event data regarding interactions between a third party, such as third party server 126, with organization 108, on behalf of the individual. For example, transaction server 114 may track third party interactions such as purchase requests, refund requests, warranty claims, account withdrawals and deposits, and any other type of interaction that third party server 126 may conduct with organization 108 on behalf of an individual such as customer. Transaction data from third party server 126 may include information about other transactions, movements, or locations of customer 101 prior to customer's 101 interaction with an entity associated with merchant 107 that may be used to assist in the authentication of customer 101. For example, if it is known that John Smith purchased coffee at a coffee shop next to a grocery store that is associated with merchant 107 minutes before an unknown customer 101 entered the premises of the grocery store, this data may be used (e.g., by authentication device 120) to create an increased confidence level that the identity of unknown customer 101 in the grocery store is John Smith. Additionally, the system may identify patterns of customer behavior from data obtained from, for example, third party server 126 and/or transaction server 114. For example, based on purchasing data obtained from transaction server 114, the system may determine that John Smith typically goes to a grocery store associated with merchant 107 on Tuesdays between 6:00 PM and 8:00 PM. This pattern of behavior may be incorporated into a customer identification profile associated with John Smith such that if an unknown customer 101 is at that grocery store at 7:00 PM on a Tuesday, authentication device 120 may generate a higher confidence level that the unknown customer 101 is John Smith than it would if the time was, for example, 3:00 PM on a Wednesday.

Local networks 116a, 116b may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local networks 116a, 116b may comprise an interface for communicating with or linking to network 106. In other embodiments, components of merchant 107 and/or organization 108 may communicate via network 106, without a separate local network 116a, 116b.

According to some embodiments, database 118 may be a database associated with organization 108 and/or its related entity that may store a variety of information relating to customers, transactions, satisfaction data, financial state data, financial policy data, and business operations. Database 118 may also serve as a back-up storage device and may contain data and information that is also stored on, for example, local databases associated with merchant server 105, transaction server 114, and authentication device 120. Database 118 may be accessed by other devices (e.g., authentication device 120) and may be used to store records relating to customer accounts, customer transactions, customer credentials, customer identification information, and sensor data obtained in relation to one or more customers or individuals.

Authentication device 120 may include a computer system configured to store, maintain, and update customer identification information and/or customer identification profiles. According to some embodiments, customer identification information may include information that may define the identity of a known customer or that is associated with the identity of the known customer such as, for example, the known customer's name, address, telephone number, social security number, and associated account information (e.g., an associated credit card account). According to some embodiments, a customer identification profile may be associated with a particular known customer and may include information that may be used in determining a confidence level that represents whether an unknown customer is the same individual as the known customer associated with the customer identification profile. In some embodiments, a customer identification profile may include customer identification information as described above as well as other information relating to a known customer such as biometric information including images of the known customer (e.g., facial and/or body images), height, weight, retina data, odor/scent, voice information (e.g., tone, pitch, rate of speech, accent, etc.), behavioral information (i.e., patterns of customer behavior such as for example, that a particular customer usually goes to the grocery store on Saturday mornings) and/or device information (e.g., information about a customer's mobile phone, smart watch, tablet, or other such devices). Thus, according to some embodiments, a customer identification profile may be a profile of a particular individual that includes known biometric, mobile device, and behavioral information associated with the particular individual, which may be used to determine the likelihood that unknown customer is the same person as the particular individual that is associated with the customer identification profile.

According to some embodiments, authentication device 120 may include a computer system configured to receive data or other communication from merchant sensors 103 and/or merchant server 105. For example, in some embodiments, authentication device 120 may receive unknown customer sensor data obtained from merchant sensors 103 such as, for example, sensor readings pertaining to customer 101, such as images and videos of the customer's face, body, and movements, audio recordings of the customer's voice, heart beat data, location data, odor/scent data, retina scan data, radio frequency data associated with a user device 102 of the customer, and the like. According to some embodiments, authentication device 120 may be configured determine whether an unknown customer 101 may be identified to be a particular individual associated with a customer identification profile stored by authentication device 120 by comparing sensor data obtained (e.g., from merchant sensors 103) in association with an unknown customer 101 to the customer identification profile. According to some embodiments, authentication device 120 may determine that an unknown customer 101 may be identified as being a particular individual associated with a customer identification profile if the sensor data overlaps with the known biometric and/or device information incorporated into the customer identification profile beyond a predetermined threshold. According to some embodiments, authentication device 120 may determine a confidence level associated with the proposition that the unknown customer 101 is the same person as the particular individual associated with the customer identification profile based on the degree of the overlap between the known biometric and/or device information incorporated into the customer identification profile and the sensor data obtained in association with the unknown customer 101.

For example, if an unknown customer 101 walks into a store, the store may have merchant sensors 103 that obtain one or more of images, videos, audio recordings, retina scans, fingerprint scans, odor/scent detection, heartbeat detection, or detection/identification of user device 102 and associated device information (collectively, "sensor data"). Authentication device 120 may then receive the sensor data and compare it to one or more customer identification profiles to determine the degree of overlap. For example, if the sensor data includes images of the unknown customer's 101 face, authentication device 120 may compare these images to known images of a particular individual's face to determine a degree of overlap or similarity. According to some embodiments, merchant sensors 103 may include a plurality of imaging devices such that authentication device 120 may perform facial detection in three dimensions via, e.g., a multiple camera matrix. According to some embodiments, merchant sensors 103 may include infrared image capture devices and three-dimensional facial detection may be performed using infrared imaging. Likewise, authentication device 120 may compare audio recordings, retina scans, fingerprint scans, heart beat patterns, walking gait patterns, visual appearance, clothing style, height, weight, and detected user device 102 characteristics of an unknown customer 101 to corresponding data points associated with known individuals, as embodied in one or more customer identification profiles. According to some embodiments, authentication device 120 may compare sensor data associated with a particular unknown customer 101 to a plurality of customer identification profiles and generate a confidence level with respect to each customer identification profile that indicates the degree of confidence that the unknown customer 101 has the same identity as the particular individual associated with the customer identification profile. For example, for a given set of sensor data, authentication device may determine that there is a 20% chance the unknown customer 101 is a first individual, there is a 55% chance the unknown customer 101 is a second individual, there is a 99.9% chance that the unknown customer 101 is a third individual, and so on.

According to some embodiments, authentication device 120 may determine that an unknown customer 101 is the same individual as a particular individual associated with a customer identification profile in response to determining that the degree of confidence of positive identification exceeds a predetermined threshold. For example, in some embodiments, authentication device 120 may determine that an unknown customer 101 is the same individual as a particular individual associated with a customer identification profile if the degree of confidence of positive identification is 95% or greater. In some embodiments, a 99% or greater degree of confidence may be required for authentication device 120 to determine that an unknown customer 101 may be positively identified as an individual associated with a given customer identification profile. As will be appreciated, in different embodiments, different predetermined minimum confidence level thresholds may be used before authentication device 120 may determine that an unknown customer 101 is positively identified as being a particular individual associated with a given customer identification profile. According to some embodiments, the predetermined minimum confidence level threshold may be set by an administrator of system 100, or it may be automatically determined by authentication device 120 using machine learning techniques. Further, in some embodiments, the predetermined minimum confidence level threshold may be based on the number, type, or quality of merchant sensors 103 that detect the unknown customer 101 biometric and/or device information. According to some embodiments, if the predetermined minimum confidence level threshold is met, that may indicate that a customer 101 has been positively identified and authentication device 120 has authorized the customer 101 to execute a transaction (e.g., purchase goods).

According to some embodiments, authentication device 120 may update a customer identification profile over time to incorporate new known biometric information, device information, or behavioral information into the profile. For example, in some embodiments, every time authentication device 120 determines that sensor data associated with an unknown customer 101 yields a confidence level above a predetermined minimum confidence level to positively identify the unknown customer 101, then authentication device 120 may update the customer identification profile corresponding to the individual that the unknown customer 101 was determined to be, with the sensor data obtained from merchant sensors 103 that was used to make the determination. Thus, as a particular individual changes over time (e.g., gets taller, has longer hair, walks slower, etc.), the customer identification profile may change to better correspond to the changing characteristics of the individual. According to some embodiments, authentication device 120 may update customer identification profiles using data obtained from, for example, social media websites, applications, health records, information submitted to the system by the user, or other information that is publicly available on for example, the Internet. According to some embodiments, authentication device 120 may update customer identification profiles using machine learning techniques.

According to some embodiments, authentication device 120 may include an intent hierarchy algorithm or program that may be configured to determine a customer's 101 purchasing intent. For example, in some embodiments, authentication device 120 may include a machine learning algorithm that can distinguish between scenarios where a customer 101 intends to purchase an item and scenarios where a customer 101 does not intend to purchase an item based on factors such as, for example, the customer's behavior, movements, actions, speech, and/or previous purchase history. In some embodiments, authentication device 120 may also include software configured to prompt the system 100 to communicate with a customer 101 to inform users of their purchases and provide a "return-purchase" functionality if an accidental purchase was made.

Although the preceding description describes various functions of user device 102, merchant sensors 102, merchant server 105, transaction server 114, database 118, authentication device 120, and third party server 126, in some embodiments, some or all of these functions may be carried out by a single computing device. For example, although FIG. 1 depicts authentication device 120 as being present in organization 108, in some embodiments, some or all of the functionalities of authentication device 120 may be carried out by merchant server 105.

For ease of discussion, embodiments may be described in connection with the authentication of an unknown customer in a store. It is to be understood, however, that disclosed embodiments are not limited to authenticating customers in a store, but may be used to authenticate customers or individuals in other environments, such as schools, offices, sporting areas, government buildings, hospitals, or any other such environment where it may be necessary to authenticate a user before allowing the user to perform some action. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 2:
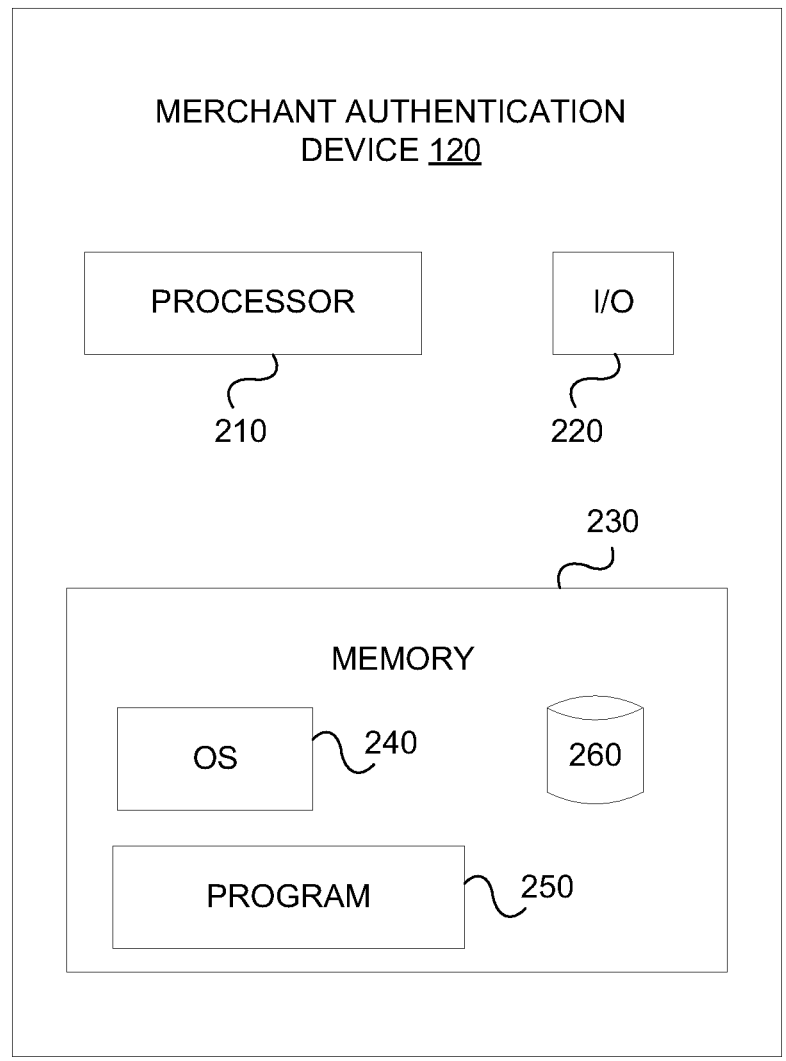
FIG. 2 is a component diagram of an exemplary authentication device, in accordance with some embodiments.

An exemplary embodiment of authentication device 120 is shown in more detail in FIG. 2. Transaction server 114, third party server 126, merchant server 105, merchant sensors 103, and/or user device 102 may have a similar structure and may include many components that are similar to or even have the same capabilities as those described with respect to authentication device 120. As shown, authentication device 120 may include a processor 210, an input/output ("I/O") device 220, a memory 230 containing an operating system ("OS") 240 and a program 250. For example, authentication device may include a program 250 for generating a confidence level of a positive customer identification in response to comparing sensor data obtained in association with an unknown customer 101 to one or more customer identification profiles stored on authentication device. Authentication device 120 may be a single device or server or may be configured as a distributed computer system including multiple servers, devices, or computers that interoperate to perform one or more of the processes and functionalities associated with the disclosed embodiments. In some embodiments, authentication device 120 may further include a peripheral interface, a transceiver, a mobile network interface in communication with the processor 210, a bus configured to facilitate communication between the various components of authentication device 120, and a power source configured to power one or more components of the authentication device 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Authentication device 120 may include one or more storage devices configured to store information used by processor 210 (or other components) to perform certain functions related to the disclosed embodiments. In some embodiments, authentication device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, authentication device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, authentication device 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, authentication device 120 may include a customer identification program 250 that is a rules-based program for estimating a confidence level that an unknown customer 101 is the same individual as an individual associated with a customer identification profile, based on sensor data obtained in association with the unknown customer 101.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable FPM device 120 to perform one or more of the processes and functionalities associated with the disclosed embodiments.

Authentication device 120 may also be communicatively connected to one or more memory devices (e.g., databases) locally or through a network. The remote memory devices may be configured to store information and may be accessed and/or managed by authentication device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Authentication device 120 may also include one or more I/O devices 220 that may comprise one or more interfaces for receiving signals or input from devices and providing signals or output to one or more devices that allow data to be received and/or transmitted by authentication device 120. For example, authentication device 120 may include interface components, which may provide interfaces to one or more input devices, such as one or more keyboards, mouse devices, touch screens, track pads, trackballs, scroll wheels, digital cameras, microphones, sensors, and the like, that enable authentication device 120 to receive data from one or more users.

In exemplary embodiments of the disclosed technology, authentication device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While user device 102, merchant sensors 103, intent-to-buy zone 104, merchant server 105, third party server 126, transaction server 114, authentication device 120, have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of user device 102, merchant sensors 103, intent-to-buy zone 104, merchant server 105, third party server 126, transaction server 114, and authentication device 120 may include a greater or lesser number of components than those illustrated.

Figure 3:
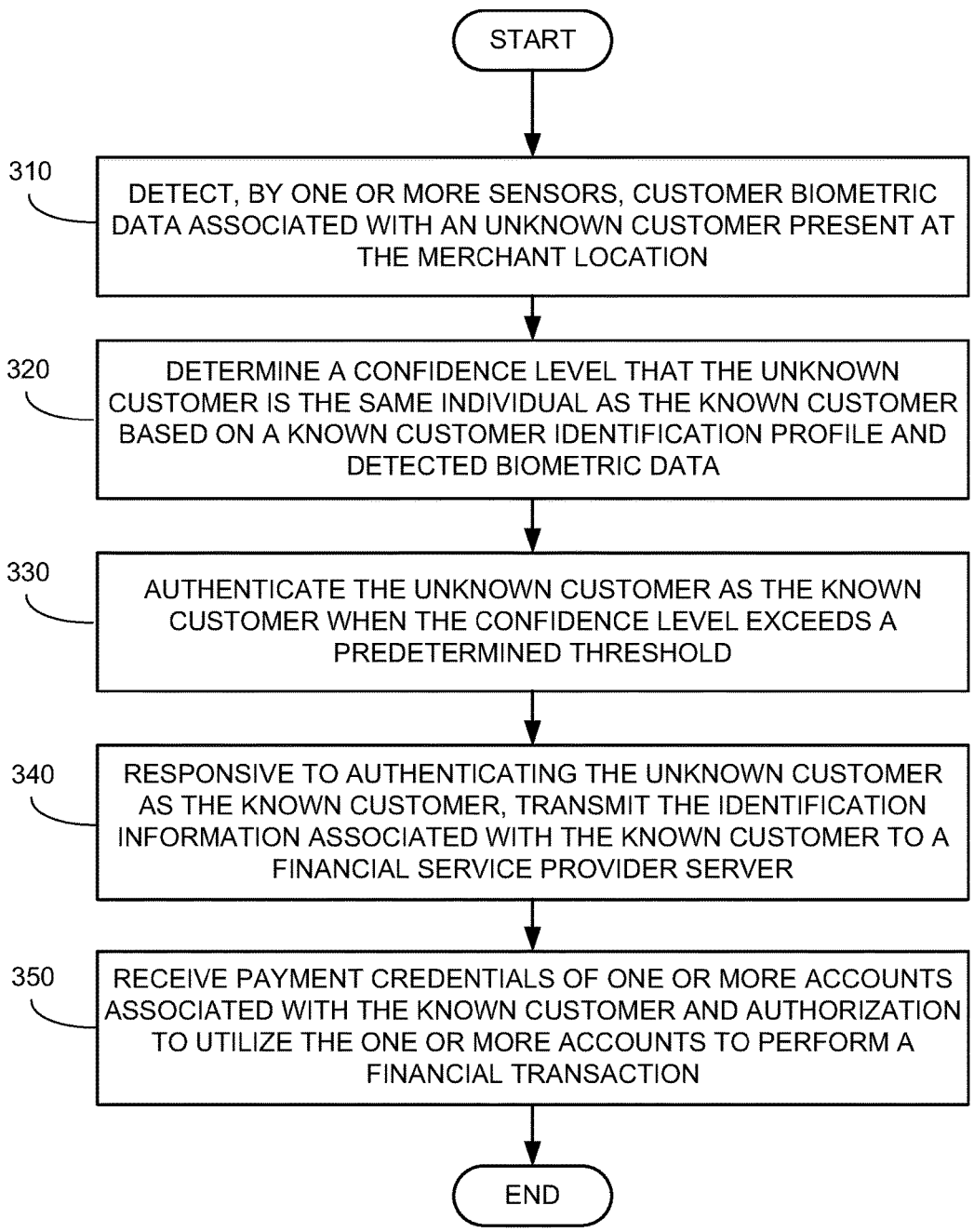
FIG. 3 is a flowchart showing operation of an exemplary customer authentication system, in accordance with some embodiments.

FIG. 3 shows a flowchart of a method 300 for authenticating a customer. Method 300 may be performed by some or all of user device 102, merchant sensors 103, intent-to-buy zone 104, merchant server 105, third party server 126, transaction server 114, database 118, and authentication device 120.

In block 310, the system may detect customer biometric data associated with an unknown customer 101 present at a merchant location. The customer biometric data may be detected by one or more sensors present at the merchant location (e.g., merchant sensors 103), such as merchant sensors 103. As described previously customer biometric data may include, for example, images, videos, audio recordings, fingerprint scans, retina scans, height information, weight information, heartbeat information/patterns, walking gait patterns/signatures, odors/scents, or other such biometric information. Merchant sensors 103 may include, for example, an imaging device, a microphone, a heartbeat sensor, a retina scanner, a fingerprint scanner, a scale, an odor/scent detector, a radio frequency detection sensor, a Bluetooth interface, or a WiFi interface. According to some embodiments, detecting customer biometric data may include for example, capturing one or more of an image, a video, a voice recording, a heartbeat recording, a retina image, an odor/scent, a fingerprint image, and/or a measured weight of the unknown customer 101. According to some embodiments, merchant sensors 103 may continuously or intermittently obtain biometric data from unknown customer 101 as unknown customer 101 moves about the merchant location. Merchant sensors 103 may track unknown customer's 101 movements and gather data that may be used to determine unknown customer's 101 position within the merchant location. According to some embodiments, the system (e.g., via merchant sensors 103 or local network 116a) may also detect device information associated with one or more user devices 102 associated with unknown customer 101. According to some embodiments, one or more merchant sensors 103 may be enabled to detect item identification data (e.g., barcodes, RF tags, beacons, etc.) present on one or more merchant items to observe and track the merchant items gathered by unknown customer 101 within the merchant location. For example, in some embodiments, system 100 may be capable of tracking unknown customer's 101 movements around a store, observing and/or detecting merchant items collected by unknown customer 101 (e.g., placing a gallon of milk and a carton of eggs in a shopping cart) so that in some embodiments, system 100 may determine one or more merchant items that unknown customer 101 intends to purchase. Further, in some embodiments, system 100 may determine unknown customer's 101 location using location data, such as GPS data obtained from user device 102. The system (e.g., merchant server 105) may be enabled to determine a total cost of merchant items collected by unknown customer 101 based on the detected item identification data. In some embodiments, the total cost may be determined in response to determining that the unknown customer 101 has entered intent-to-buy zone 104 proximate the merchant location. In some embodiments, system 100 may determine that unknown customer 101 has entered intent-to-buy zone 104 by one or more merchant sensors 103 detecting that unknown customer 101 has entered a threshold proximity to an exit of the merchant location. According to some embodiments, system 100 may use location data (e.g., GPS data) at the time of an attempted check out to assist in authenticating unknown customer 101 by as the system may infer that a known individual associated with the user device 102 from which the location data is obtained may be in the vicinity of the physical location of the attempted purchase.

In block 320, the system may determine (e.g., at merchant server 105) a confidence level that the unknown customer 101 is the same individual as the known customer, based on a known customer identification profile associated with a particular known customer and the detected customer biometric data and/or the detected customer device information. According to some embodiments, the system may receive, store, or load a plurality of known customer identification profiles, each associated with a particular known customer. As previously described above, a customer identification profile may include information sufficient to determine the identity of a particular individual, such as biometric data, behavioral information, and/or device information associated with the particular individual. Accordingly, a known customer identification profile received by the system may include identification information of the known customer and known customer biometric data. According to some embodiments, identification information of the known customer may include information that defines the identity of the known customer or that is associated with the identity of the known customer such as, for example, the known customer's name, address, telephone number, social security number, and associated account information (e.g., an associated credit card account). In some embodiments, known customer biometric data may include biometric data known to be associated with the particular individual that is associated with the known customer identification profile. For example, known customer biometric data may include images, videos, audio recordings, fingerprint scans, retina scans, height information, weight information, heartbeat information/patterns, walking gait patterns/signatures, or other such biometric data that has been obtained from the particular individual in the past. Likewise, in some embodiments, known behavioral information may be data that represents patterns of behavior of the particular individual, such as location data that indicates patterns or movement, purchase data that indicates purchasing patterns, or any other such data that may be useful in identifying an individual by virtue of their behavior. Further, in some embodiments, device information may be information pertaining to devices associated with a particular individual such as information pertaining to the individual's mobile phone, tablet, smart watch, or other wearable devices. Device information may include operating system, screen size, memory size, device manufacturer, ID names or numbers, MAC addresses, third party application, third party application credentials, GPS/location data, or other such information that may be used to identify or determine characteristics of a particular device.

According to some embodiments, the system (e.g., via merchant server 105) may compare the sensor data to the known customer identification profile to determine a confidence level that the unknown customer 101 is the same individual as the known customer in a manner similar to that as described previously above. For example, merchant sensors 105 may take digital photographs of the unknown customer's 101 face, and merchant server 105 may compare the digital photographs to image data included in one or more known customer identification profiles to determine the degree of a match that is found. In other words, merchant server 105 may compare the obtained images of the unknown customer 101 to images of known individuals and determine the degree of matching. Further, merchant server 105 may compare other detected quantities, such as height, weight, body type, gait, heart beat patterns, retina scan information, odor/scent, fingerprint scan information, audio recordings, and radio frequency information of devices associated with unknown customer 101 to corresponding known data of one or more customer identification profiles and based on the collective degree of overlap between all of these quantities, merchant server 105 may determine the confidence level that the unknown customer 101 is the same person as a known customer associated with a particular customer identification profile. In some embodiments, the determination may also be based on behavioral information that is included in the known customer identification profile.

Although block 320 refers to the system receiving, storing, or loading a known customer identification profile associated with a particular known customer, in some embodiments, the system (e.g., merchant server 105) may receive, store, or load a plurality of known customer identification profiles, wherein each known customer identification profile is associated with one of a plurality of other known customers. Accordingly, each of the plurality of customer identification profiles may include identification information, biometric data, device information, and behavioral information associated with a unique known customer.

Thus, in some embodiments, the system (e.g., merchant server 105) may determine a plurality of confidence levels, where each confidence level is associated with a particular known customer identification profile and each confidence level represents a probability or likelihood that an unknown customer 101 is the same individual as the known customer associated with the respective known customer identification profile.

In block 330, the system may authenticate (e.g., at merchant server 105) the unknown customer 101 as the known customer when the confidence level exceeds a predetermined threshold. For example, if the predetermined threshold is 95%, when the system determines that the confidence level determined at block 330 exceeds 95%, then the unknown customer 101 may be authenticated as the known customer. In other words, system 100 has a sufficient confidence level to determine that unknown customer 101 is the same individual as the known customer associated with the known customer identification profile that yielded the confidence level that exceeds the predetermined threshold. Thus, authenticating an unknown customer 101 may be thought of as verifying the unknown customer's 101 identity within a predetermined confidence level. Once authenticated, system 100 may associate known identification information (e.g., name, address, phone number, etc.) with the unknown customer 101 such that unknown customer 101 may now be considered to be a known customer 101. According to some embodiments, the system may update a known customer identification profile associated with a confidence level that is determined to be above a predetermined threshold to include the detected data. For example, if John Smith walks through a store and merchant sensors 103 obtain images and audio of him sufficient to generate a confidence level that exceeds a predetermined threshold, then system 100 may update the known customer identification profile associated with John Smith to include the newly acquired images and audio. In this way, the known customer identification profiles may be repeatedly updated using, for example machine learning techniques, to gradually account for the changing features (e.g., height, weight, etc.) of a particular individual as they change over time.

In some embodiments, system 100 may be configured to generate multiple confidence levels in association with one unknown customer 101. For example, according to some embodiments, as an unknown customer 101 walks around a merchant location (e.g., a store), sensors 103 may continuously or intermittently gather biometric data on unknown customer 101, which may then be compared against a known customer identification profile (e.g., by merchant server 105) to generate a confidence level that unknown customer 101 is the same person as the person that is associated with the known customer identification profile (i.e., the known customer). Accordingly, in some embodiments, system 100 may repeatedly obtain additional sensor data and update the generated confidence level such that, if unknown customer 101 is the same person as a first known customer associated with a first known customer identification profile, the generated confidence level will generally continue to increase as more sensor data is gathered by merchant sensors 103. According to some embodiments, the system (e.g., merchant server 105) may generate a confidence level using detected device information and/or behavioral information. Behavioral information may include the time, date, day of the week, location, event status (e.g., a sale is occurring), or other such information about the environment.

In block 340, the system (e.g., merchant server 105) may, in response to authenticating the unknown customer as the known customer, transmit identification information associated with the known customer to a financial service provider server (e.g., transaction server 114). For example, after the system identifies a particular unknown customer 101 as being, for example, John Smith, merchant server 105 may transmit identification information associated with John Smith, such as name, address, phone number, social security number, ID number, and the like, to a financial service provider server (e.g., transaction server) to prompt the financial service provider to provide account information associated with John Smith that may be used by system 100 to execute a transaction on his behalf. According to some embodiments, the system may also transmit the total cost of one or more merchant items that have been collected by unknown customer 101 to the financial service provider server. For example, in some embodiments, the total cost may be transmitted to the financial service provider server in response to the system determining that unknown customer 101 has entered intent-to-buy zone 104 proximate the merchant location.

In block 350, the system (e.g., merchant server 105) may receive payment credentials of one or more account associated with the known customer and authorization to utilize the one more accounts to perform a financial transaction. In some embodiments, the payment credentials and authorization may be received from a financial service provider server, such as, for example, transaction server 114. According to some embodiments, payment credentials may be credit or debit card information or other financial service account information that may be used to execute a financial transaction. Accordingly, in the example where the system authenticates John Smith and sends his identification information to a financial service provider server, the financial service provider server may respond by providing information relating to a credit card or bank account associated with John Smith, which may then be used to execute a transaction. In some embodiments, the system (e.g., merchant server 105) may receive an authorization to utilize the one or more accounts associated with the known customer to purchase one or more merchant items.

Figure 4:
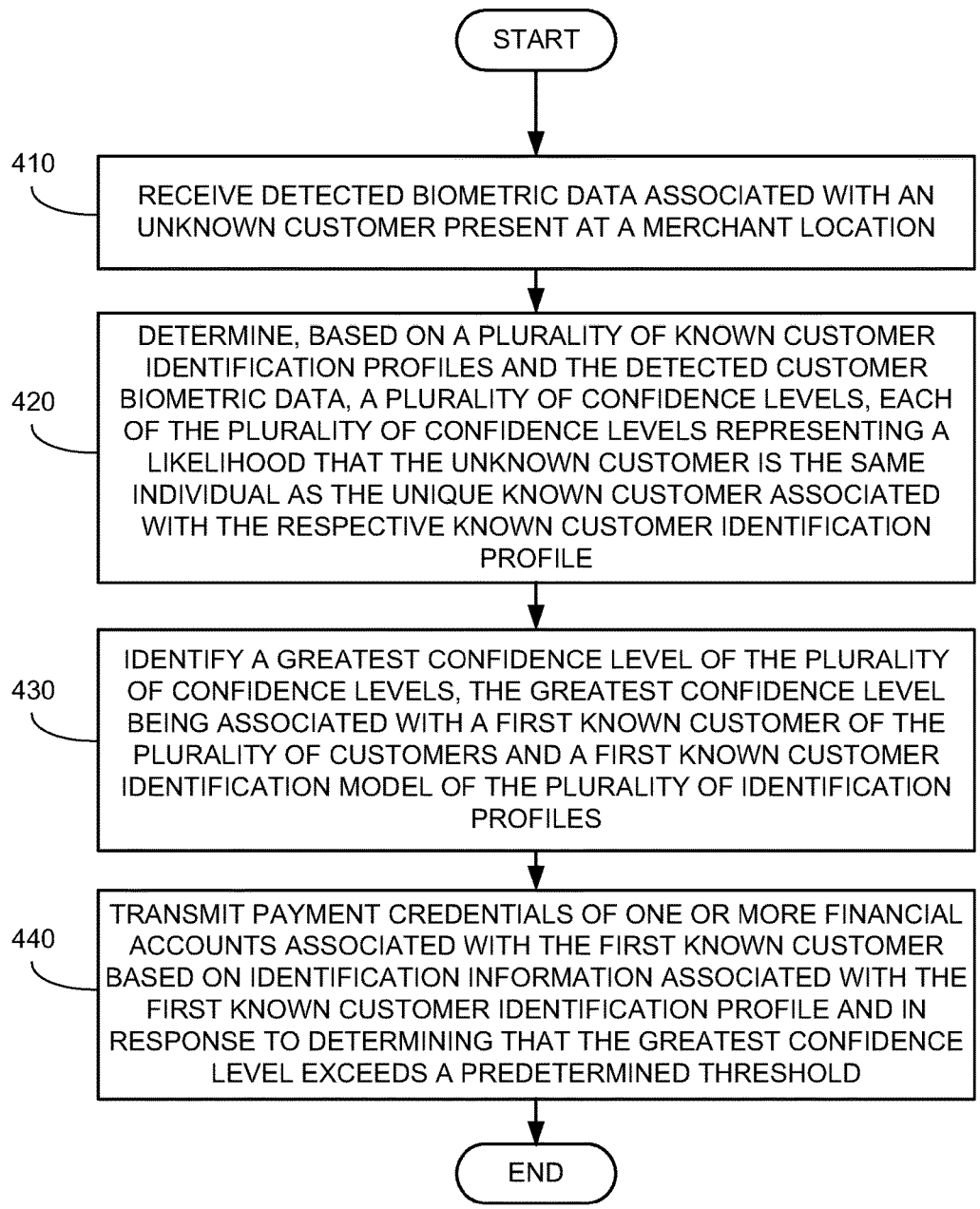
FIG. 4 is a flowchart showing operation of an exemplary customer authentication system, in accordance with some embodiments.

FIG. 4 shows a flowchart of a method 400 for authenticating a customer. Method 400 may be performed by some or all of user device 102, merchant sensors 103, intent-to-buy zone 104, merchant server 105, third party server 126, transaction server 114, database 118, and authentication device 120.

In block 410, the system (e.g., authentication server 120) may receive detected biometric data associated with an unknown customer 101 present at a merchant location. As described above, detected biometric data may be obtained from, for example merchant sensors 103. According to some embodiments, authentication server 120 may receive the detected biometric data from merchant server 105. Detected biometric data may include, for example, data that is representative of one or more of a face, a body image, a height, a weight, a voice signature, a fingerprint, a retina, a gait, and a heart rate.

In block 420, the system (e.g., authentication server 120) may determine, based on a plurality of known customer identification profiles associated with a plurality of known customers and the detected customer biometric data, a plurality of confidence levels. According to some embodiments, each of the plurality of known customers may be unique. As previously described above with respect to method 300, the customer identification profiles may include identification information, biometric data, device information, and/or behavioral information associated with a known customer. Each of the plurality of confidence levels may represent a likelihood that the unknown customer 101 is the same individual as a unique known customer associated with a respective known customer identification profile. In other words, the system (e.g., authentication server 120) may determine a plurality of confidence levels corresponding to the plurality of known customer identification profiles by comparing the detected customer biometric data to each of the plurality of known customer identification profiles in a manner similar to that described above with respect to block 330.

In block 430, the system (e.g., authentication server 120) may identify a greatest confidence level of the plurality of confidence levels, where the greatest confidence level is associated with a first known customer of the plurality of customers and a first known customer identification profile of the plurality of identification profiles. For example, the system may include known customer identification profiles associated with John Smith, Harry Jones, and Matt Ford, and the system (e.g., authentication server 120) may determine that the unknown customer 101 is John Smith with a confidence level of 98%, that the unknown customer 101 is Harry Jones with a confidence level of 78%, and that the unknown customer is Matt Ford with a confidence level of 30%. In this exemplary case, system 100 may determine that the greatest confidence level of the plurality is 98%, which is associated with John Smith.

In block 440, the system (e.g. authentication server 120) may transmit payment credentials of one or more financial accounts associated with the first known customer based on identification information associated with the first known customer identification profile and in response to determining that the greatest confidence level exceeds a predetermined threshold. Thus, in the previous exemplary case, upon determining that the confidence level 98% associated with John Smith exceeds a predetermined threshold (e.g., 95%), the system may then transmit credit card information associated with John Smith. In some embodiments, the payment credentials may be transmitted to, for example, merchant server 105.

In some embodiments, authentication server 120 may be configured to receive a transaction amount corresponding to the cost of one or more merchant items that have been collected by the unknown customer at the merchant location, determine an authorized transaction amount in association with one of the one or more financial accounts associated with the first known customer based on at least financial account data associated with the first known customer and the greatest confidence level, and transmit the authorized transaction amount to the merchant server.

According to some embodiments, if the system (e.g., authentication server 120) determines that the greatest confidence level fails to exceed the predetermined threshold, then the system may transmit a notification to for example, merchant server 105, indicating that the known customer 101 has not been authenticated and is not authorized to complete a transaction. In some embodiments, in response to determining that the greatest confidence level fails to exceed the predetermined threshold, the system (e.g. authentication server 120) may transmit a notification to the merchant server requesting a second-level authentication action, such as, for example, requesting that an employee of the merchant require the unknown customer 101 to produce identification and/or perform a scan of an identification document of the unknown customer 101 (e.g., via merchant sensor 103).

Figure 5:
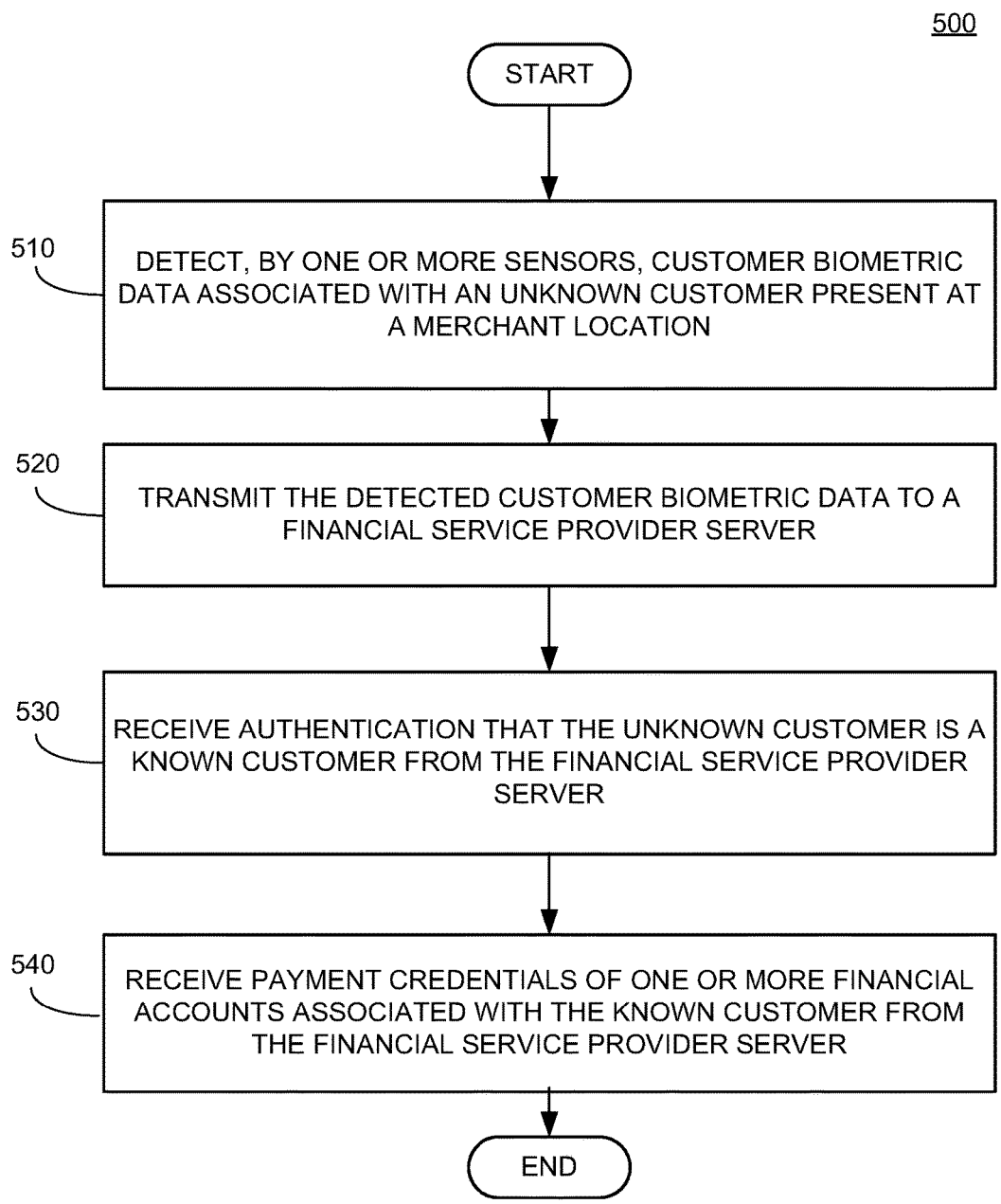
FIG. 5 is a flowchart of a method of for authenticating a customer, in accordance with some embodiments.

FIG. 5 shows a flowchart of a method 500 for authenticating a customer. Method 500 may be performed by some or all of user device 102, merchant sensors 103, intent-to-buy zone 104, merchant server 105, third party server 126, transaction server 114, database 118, and authentication device 120.

In block 510, the system may detect, by one or more sensors (e.g., merchant sensors 103), customer biometric data associated with an unknown customer 101 present at a merchant location. In block 520, the system may transmit the detected customer biometric data to a financial server provider server, such as for example, transaction server 114. In block 530, the system (e.g., merchant server 105) may receive authentication that the unknown customer is a known customer from the financial service provider server (e.g., authentication device 120). In block 540, the system may receive payment credentials of one or more financial accounts associated with the known customer from the financial service provider server.

According to some embodiments, method 500 may further include detecting (e.g., by merchant sensors 103) item identification data for one or more merchant items that have been collected by the unknown customer 101, determining a total cost of the one or more merchant items (e.g., by merchant server 105) based on the identification data, and displaying, to the unknown customer, the total cost of the one or merchant items. Accordingly, in some embodiments, a customer 101 may walk around a store, picking up items, and upon entering or approaching a predetermined area (e.g., intent-to-buy zone 104), the system may display the total cost of the items to the customer 101 so that the customer may decide whether or not they would like to proceed with a purchase of the items. Accordingly, in some embodiments, method 500 may include detecting (e.g., via merchants sensors 103) that the unknown customer 101 has entered an intent-to-buy zone 104 proximate the merchant location, transmitting the total cost of the one or more merchant items to the financial service provider server (e.g., transaction server 114), and receiving from the financial service provider server, a notification indicating whether there is authorization to utilize the one or more financial accounts associated with the known customer to purchase the one or more merchants items.

Figure 6:
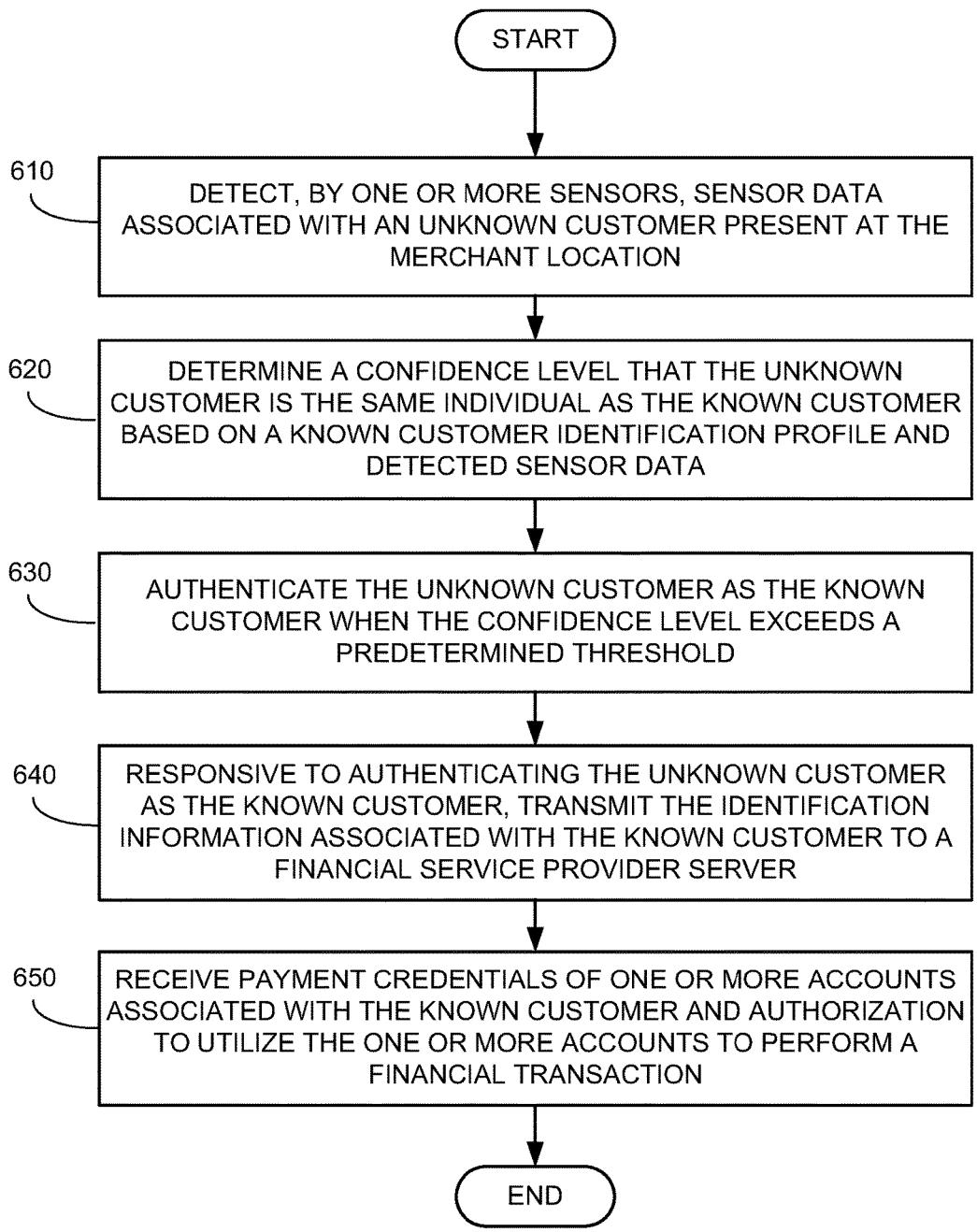
FIG. 6 is a flowchart showing operation of an exemplary customer authentication system, in accordance with some embodiments.

FIG. 6 shows a flowchart of a method 600 for authenticating a customer. Method 600 may be performed by some or all of user device 102, merchant sensors 103, intent-to-buy zone 104, merchant server 105, third party server 126, transaction server 114, database 118, and authentication device 120.

Method 600 may include steps that mirror the steps presented with respect to method 300, described above, except that instead of the system detecting and utilizing customer biometric data to determine a confidence level that unknown customer 101 is the same individual as the known customer, in accordance with method 600 the system may instead detect and utilize sensor data to determine a confidence level that unknown customer 101 is the same individual as the known customer based on a known customer identification profile that may include one or more of identification information, biometric data associated with the known customer and device information associated with the known customer. According to some embodiments, detected sensor data may include detected customer biometric data associated with an unknown customer 101 present at the merchant location and/or detected device information that is associated with unknown customer 101 (or user device 102 associated with unknown customer 101). Thus, at block 620, the system may determine a confidence level that the unknown customer 101 is the same individual as the known customer, based on a known customer identification profile associated with a particular known customer and the detected sensor data, which may include customer biometric data and/or detected customer device information. Accordingly, in some embodiments, the system may determine a confidence level based only on detected customer biometric data, based only on detected customer device information, or based on a combination of both. It should be understood that although methods 300, 400, 500 are directed towards the detection and use of customer biometric data to determine a confidence level that unknown customer 101 is the same individual as the known customer, it is contemplated that each of these methods may be modified to include the additional or exclusive detection and/or utilization of device information to make such a determination. Further, it is also contemplated that in some embodiments, the methods described herein may also be modified such that the system may additionally base a determination of a confidence level that the unknown customer 101 is the same individual as the known customer on behavioral information included in the known customer identification profile.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. A customer who wants to purchase items at a store in association with a financial account (such as a debit account or credit card) is generally required to provide identification to protect against fraud. However, the system (e.g., system 100) may enable a customer to enter a store and make a purchase without any carrying identification or payment credentials (such as a credit card) on their person. A customer may enter a store, and one or more sensors (e.g., merchant sensors 103) positioned within the store may take various biometric readings from the customer, such as photos, audio recordings, retina scans, fingerprint scans, and the like, as well as detecting devices (e.g., user device 102) the customer is carrying with them. The system (e.g., via authentication device 120) may then compare this sensor data to a plurality of stored customer identification profiles to attempt to identify who the customer is by comparing the sensor data to data on known individuals. The system (e.g., via authentication device 120) may generate a confidence level that the customer is identified to be a particular known person, and if that confidence level exceeds a predetermined threshold (e.g., 95%), then the system may authorize a transaction using an account associated with the identified customer. Accordingly, a customer may walk around a store, picking up items, and as the system acquires more sensor data, the confidence level of the identification of the customer may increase until it surpasses the threshold and the customer is positively identified. Once the customer is positively identified, the system (e.g., via transaction server 114) may authorize a purchase transaction in association with an account of the identified customer, such as a particular credit card account, thus enabling the identified customer to make a purchase without providing any form of identification or payment information to the store. The customer may signify their intent to purchase items and initiate a transaction by entering an intent-to-buy zone with their selected items, which may be detected by the system (e.g., via merchant sensors 103), and the system (e.g., via transaction server 114) may automatically debit the identified customer's financial account with the amount of the purchased goods.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A system for authenticating a customer, comprising:
one or more processors;
one or more sensors in communication with the one or more processors, the one or more sensors being positioned proximate a merchant location; and
a memory in communication with the one or more processors and storing instructions that, when executed by the one or more processors, are configured to cause the system to:
   detect, by the one or more sensors, at one or more locations within the merchant location, and at a plurality of points of time while an unknown customer is present at the merchant location, customer biometric data associated with the unknown customer;
   determine, based on a known customer identification profile associated with a known customer and the customer biometric data, a confidence level that the unknown customer is the known customer, wherein the known customer identification profile comprises: identification information, purchase history, customer activity in the merchant location, and biometric data associated with the known customer;
   authenticate, in response to the confidence level exceeding a predetermined threshold and before the unknown customer enters a predetermined intent-to-buy zone, the unknown customer as the known customer;
   responsive to authenticating the unknown customer as the known customer, transmit the identification information associated with the known customer to a financial service provider server;
   receive, from the financial service provider server, payment credentials of one or more accounts associated with the known customer and authorization to utilize the one or more accounts to perform a financial transaction;
   observe, by the one or more sensors, one or more merchant items that have been collected by the unknown customer as each of the one or more merchant items are placed into a cart of the unknown customer;
   determine, based on the one or more merchant items, a total cost of the one or more merchant items that have been collected by the unknown customer;
   automatically process, in response to determining that the known customer has entered a predetermined intent-to-buy zone, a payment of the one or more merchant items using the payment credentials; and
   determining an accidental purchase by the known customer based on the purchase history and the customer activity including customer movements in the merchant location; and
   providing an alert to the known customer, based on the accidental purchase, wherein the alert comprises at least one item return option associated with the total cost of the one or more merchant items.

2. The system of claim 1, wherein determining the total cost of the one or more merchant items is performed in response to determining that the unknown customer has entered the predetermined intent-to-buy zone proximate the merchant location.

3. The system of claim 2, wherein determining that the unknown customer has entered the predetermined intent-to-buy zone comprises detecting, by the one or more sensors, that the unknown customer has entered a threshold proximity to an exit of the merchant location.

4. The system of claim 1, further configured to:
transmit the total cost to the financial service provider server; and
receive, from the financial service provider server, authorization to utilize the one or more accounts associated with the known customer to purchase the one or more merchant items.

5. The system of claim 4, wherein the total cost is transmitted to the financial service provider server in response to determining that the unknown customer has entered the predetermined intent-to-buy zone proximate the merchant location.

6. The system of claim 1, wherein determining the confidence level that the unknown customer is the known customer comprises determining a degree of overlap between the customer biometric data associated with the unknown customer and the biometric data associated with the known customer.

7. The system of claim 1, further configured to:
receive a plurality of other known customer identification profiles each associated with one of a plurality of other known customers and comprising the identification information and the biometric data associated with the respective one of the plurality of other known customers; and
determine, based on the plurality of other known customer identification profiles and the customer biometric data, a plurality of other confidence levels that the unknown customer is the same individual as each of the plurality of other known customers, respectively.

8. The system of claim 1, wherein the one or more sensors further comprise one or more of a microphone, a heartbeat sensor, a retina scanner, an odor/scent detector, a fingerprint scanner, and a scale, and detecting the customer biometric data associated with the unknown customer further comprises capturing one or more of a voice recording, a heartbeat recording, a retina image, an odor/scent, a fingerprint image, and a measured weight of the unknown customer.

9. The system of claim 1, wherein:
the one or more sensors further comprise one or more of a radio frequency detection sensor, a Bluetooth interface, and a WiFi interface;
the known customer identification profile further comprises device information associated with the known customer; and
determining the confidence level that the unknown customer is the known customer comprises detecting, by the one or more sensors, mobile device information associated with the unknown customer and determining, based on the known customer identification profile, the customer biometric data, and the mobile device information, the confidence level that the unknown customer is the known customer.

10. The system of claim 1, further configured to update the known customer identification profile to include the customer biometric data in response to determining that the confidence level exceeds the predetermined threshold, such that the known customer identification profile corresponds to changing characteristics of the known customer.

11. The system of claim 1, wherein the customer biometric data comprises at least one of video or audio captured while the unknown customer selects one or more merchant items at the merchant location.

12. The system of claim 1, wherein the instructions, when executed by the one or more processors, are further configured to cause the system to, in response to the confidence level failing to exceed the predetermined threshold, detect, by the one or more sensors, additional customer biometric data associated with the unknown customer, and redetermine, based on the customer biometric data and the additional customer biometric data, the confidence level.

13. The system of claim 3, wherein the system is configured to authenticate the unknown customer as the known customer, determine the total cost of the one or more merchant items that have been collected by the unknown customer, and process the payment without any overt interactions with the system by the known customer.

14. The system of claim 1, wherein the one or more sensors comprise an image sensor and a scale, and the customer biometric data comprises information corresponding to walking gait of the customer based on images captured by the image sensor and weight data captured of the customer by the scale.

15. A system for authenticating a customer, comprising:
one or more processors; and
a memory in communication with the one or more processors and storing instructions that, when executed by the one or more processors, are configured to cause the system to:
receive, from a merchant server, customer biometric data associated with an unknown customer present at a merchant location, the customer biometric data being detected as the unknown customer collects one or more merchant items within the merchant location;
determine, based on a plurality of known customer identification profiles associated with a plurality of known customers and the customer biometric data, a plurality of confidence levels, each of the plurality of confidence levels representing a likelihood that the unknown customer is a known customer associated with a known customer identification profile, wherein each known customer identification profile comprising: identification information, purchase history, customer activity in the merchant location; and biometric data associated with a unique known customer of the plurality of known customers; and
identify a greatest confidence level of the plurality of confidence levels, the greatest confidence level being associated with a first known customer of the plurality of known customers and a first known customer identification profile of the plurality of known customer identification profiles;
transmit, based on the identification information associated with the first known customer identification profile and responsive to determining that the greatest confidence level exceeds a predetermined threshold, payment credentials of one or more financial accounts associated with the first known customer to the merchant server;
determine an accidental purchase by the first known customer based on the purchase history and the customer activity including customer movements in the merchant location; and
provide an alert to the first known customer, based on the accidental purchase, wherein the alert comprises at least one item return option associated with a total cost of the one or more merchant items.

16. The system of claim 15, further configured to:
receive a transaction amount corresponding to the total cost of the one or more merchant items that have been collected by the unknown customer at the merchant location;
determine an authorized transaction amount in association with one of the one or more financial accounts associated with the first known customer based on at least financial account data associated with the first known customer and the greatest confidence level; and
transmit the authorized transaction amount to the merchant server.

17. The system of claim 15, wherein the biometric data comprises data that is representative of one or more of a face, a body type, a height, a weight, a voice signature, a fingerprint, a retina, a gait, and a heart rate.

18. A method for authenticating a customer, comprising:
detecting, by one or more sensors and at one or more locations within a merchant location, customer biometric data associated with an unknown customer present at the merchant location;
transmitting, to a financial service provider server, the customer biometric data;
receiving, from the financial service provider server, authentication that the unknown customer is a known customer;
receiving, from the financial service provider server, payment credentials of one or more financial accounts associated with the known customer;
determining an accidental purchase by the known customer based on customer purchase history and customer activity including customer movements in the merchant location; and
providing an alert to the known customer, based on the accidental purchase, wherein the alert comprises at least one item return option associated with a total cost of one or more merchant items.

19. The method of claim 18, further comprising:
detecting, by the one or more sensors, item identification data for one or more merchant items that have been collected by the unknown customer;
determining, by a merchant server and based on the item identification data, the total cost of the one or more merchant items; and
displaying, to the unknown customer, the total cost of the one or more merchant items.

20. The method of claim 19, further comprising:
detecting, by the one or more sensors, that the unknown customer has entered an intent-to-buy zone proximate the merchant location;
transmitting, to the financial service provider server, the total cost of the one or more merchant items; and
receiving, from the financial service provider server, a notification indicating whether there is authorization to utilize the one or more financial accounts associated with the known customer to purchase the one or more merchant items.

21. A system for authenticating a customer, comprising:
one or more processors;
one or more sensors in communication with the one or more processors, the one or more sensors being positioned proximate a merchant location; and
a memory in communication with the one or more processors and storing instructions that, when executed by the one or more processors, are configured to cause the system to:

detect, by the one or more sensors at a plurality of time points while an unknown customer is present at the merchant location, sensor data associated with the unknown customer, wherein the sensor data comprises one or more of customer biometric data and device information associated with the unknown customer;

determine, based on a known customer identification profile associated with a known customer and the sensor data, a confidence level that the unknown customer is the known customer, wherein the known customer identification profile comprises identification information, biometric data associated with the known customer, purchase history, customer activity in the merchant location; and device information associated with the known customer;

authenticate the unknown customer as the known customer when the confidence level exceeds a predetermined threshold;

responsive to authenticating the unknown customer as the known customer, transmit the identification information associated with the known customer to a financial service provider server;

receive, from the financial service provider server, payment credentials of one or more accounts associated with the known customer and authorization to utilize the one or more accounts to perform a financial transaction;

update the biometric data associated with the known customer with the customer biometric data for future customer identification, such that the known customer identification profile corresponds to changing characteristics of the known customer; and determining an accidental purchase by the known customer based on the purchase history and the customer activity including customer movements in the merchant location; and providing an alert to the known customer, based on the accidental purchase, wherein the alert comprises at least one item return option associated with a total cost of one or more merchant items.

* * * * *